(12) United States Patent
Cheng et al.

(10) Patent No.: US 10,523,324 B2
(45) Date of Patent: Dec. 31, 2019

(54) SYSTEM AND METHODS FOR NON-ORTHOGONAL MULTIPLE ACCESS

(71) Applicant: CABLE TELEVISION LABORATORIES, INC, Louisville, CO (US)

(72) Inventors: Lin Cheng, Superior, CO (US); Luis Alberto Campos, Superior, CO (US); Jing Wang, Broomfield, CO (US); Zhensheng Jia, Superior, CO (US)

(73) Assignee: Cable Television Laboratories, Inc, Louisville, CO (US)

( * ) Notice: Subject to any disclaimer, the term of this patent is extended or adjusted under 35 U.S.C. 154(b) by 0 days.

(21) Appl. No.: 16/180,912

(22) Filed: Nov. 5, 2018

(65) Prior Publication Data

US 2019/0140741 A1    May 9, 2019
US 2019/0372670 A9    Dec. 5, 2019

Related U.S. Application Data

(60) Provisional application No. 62/581,339, filed on Nov. 3, 2017.

(51) Int. Cl.
| | |
|---|---|
| *H04B 10/00* | (2013.01) |
| *H04B 10/2575* | (2013.01) |
| *H04B 10/27* | (2013.01) |
| *H04J 99/00* | (2009.01) |
| *H04W 72/04* | (2009.01) |
| *H04J 14/00* | (2006.01) |

(52) U.S. Cl.
CPC ... *H04B 10/2575* (2013.01); *H04B 10/25753* (2013.01); *H04B 10/27* (2013.01); *H04J 15/00* (2013.01); *H04W 72/04* (2013.01)

(58) Field of Classification Search
CPC .................................. H04J 4/00; H04J 4/005
See application file for complete search history.

(56) References Cited

U.S. PATENT DOCUMENTS

| | | | |
|---|---|---|---|
| 2019/0109683 A1* | 4/2019 | Kimura | ................ H04L 5/0014 |
| 2019/0165872 A1* | 5/2019 | Matsuda | .................. H04J 1/00 |
| 2019/0165906 A1* | 5/2019 | Bala | ........................ H04J 11/00 |
| 2019/0174516 A1* | 6/2019 | Shimezawa | ....... H04W 72/0446 |

* cited by examiner

*Primary Examiner* — Daniel G Dobson
(74) *Attorney, Agent, or Firm* — Armstrong Teasdale LLP

(57) ABSTRACT

A resource allocation method is provided for a non-orthogonal multiple access distribution of access network users communicatively coupled to a single transport medium. The method includes steps of allocating a first frequency and time domain resource to a first user and a second frequency and time domain resource to a second user of the access network users, obtaining channel information regarding a particular communication channel of the access network for which resources are allocated, grouping the first user with the second user based on an overlap of the first frequency and time domain resource with the second frequency and time domain resource, and assigning the first user to a different power allocation resource than the second user within the frequency and time domain overlap.

11 Claims, 8 Drawing Sheets

(PRIOT ART)

SYSTEM AND METHODS FOR NON-ORTHOGONAL MULTIPLE ACCESS

CROSS REFERENCE TO RELATED APPLICATIONS

This application claims the benefit of and priority to U.S. Provisional Patent Application Ser. No. 62/581,339, filed Nov. 3, 2017, which is incorporated herein by reference in its entirety.

BACKGROUND

The field of the disclosure relates generally to communication systems and networks, and more particularly, to communications systems and networks employing non-orthogonal multiple access.

Conventional hybrid fiber-coaxial (HFC) architectures typically deploy fiber strands from an optical hub to a fiber node, and often many short coaxial or fiber strands to cover the shorter distances from the fiber nodes to a plurality of end users. Conventional Multiple Service Operators (MSOs) offer a variety of services, including analog/digital TV, video on demand (VoD), telephony, and high speed data internet, over these HFC networks, which utilize both optical fibers and coaxial cables, and which provide video, voice, and data services to the end user subscribers. HFC networks are known to include a master headend, and the optical fiber strands carry the optical signals between the headend, the hub, and the fiber node. Conventional HFC networks also typically include a plurality of coaxial cables to connect the fiber nodes to the respective end users, and to carry radio frequency (RF) modulated analog electrical signals.

The HFC fiber node converts optical analog signals from the optical fiber into the RF modulated electrical signals that are transported by the coaxial cables to the end users/subscribers. In the conventional HFC network, both the optical and electrical signals are analog, from the hub to the end user subscriber's home. Typically, a modem termination system (MTS) is located at either the headend or the hub, and provides complementary functionality to a modem of the respective end user.

The signal components of the conventional HFC fiber/coaxial cable links experience higher propagation attenuation at higher frequency. The attenuation increases over distance and this attenuation effect is particularly significant in coaxial cables. Thus, different users of the network will experience difference system performance at different distances from the fiber node, at different operation frequencies. Conventional HFC networks, however, implement orthogonal multiple access (OMA) techniques to allocate resources orthogonally in the frequency and time domains.

FIG. 1 is a graphical illustration depicting a conventional orthogonal multiple access (OMA) two-dimensional frequency-time-power distribution 100 of users 102. In the exemplary embodiment illustrated in FIG. 1, distribution 100 is depicted with respect to a conventional HFC network that implements a communication protocol such as the Data Over Cable Service Interface Specification (DOCSIS), or DOCSIS version 3.1 (D3.1). In this example, each of the several different users 102 are illustrated as occupying different frequency-time slots on (e.g., on a 2-D plane) and do not overlap with other users 102.

According to conventional OMA distribution 100, the OMA techniques of distribution 100 do not consider the respective variations experienced by users 102 according to the distance of a particular user 102 from the node, or the frequency slot at which that user 102 is operating. More particularly, the conventional OMA techniques do not optimize resource allocation based on these variations, thereby resulting in low spectral efficiency. Accordingly, it is desirable to provide techniques that consider the channel differences of different users and frequencies to optimize network resource allocation, and in an equitable manner, to increase the spectral efficiency and throughput of the network.

BRIEF SUMMARY

In an embodiment, a resource allocation method is provided for a non-orthogonal multiple access distribution of access network users communicatively coupled to a single transport medium. The method includes steps of allocating a first frequency and time domain resource to a first user and a second frequency and time domain resource to a second user of the access network users, obtaining channel information regarding a particular communication channel of the access network for which resources are allocated, grouping the first user with the second user based on an overlap of the first frequency and time domain resource with the second frequency and time domain resource, and assigning the first user to a different power allocation resource than the second user within the frequency and time domain overlap.

In an embodiment, a resource allocation method is provided for a non-orthogonal multiple access distribution of access network users communicatively coupled to a single transport medium. The method includes steps of allocating a first frequency and time domain resource to a first user and a second frequency and time domain resource to a second user of the access network users, obtaining channel information regarding a particular communication channel of the access network for which resources are allocated, grouping the first user with the second user based on an overlap of the first frequency and time domain resource with the second frequency and time domain resource, and assigning the first user to a different code allocation resource than the second user within the frequency and time domain overlap.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
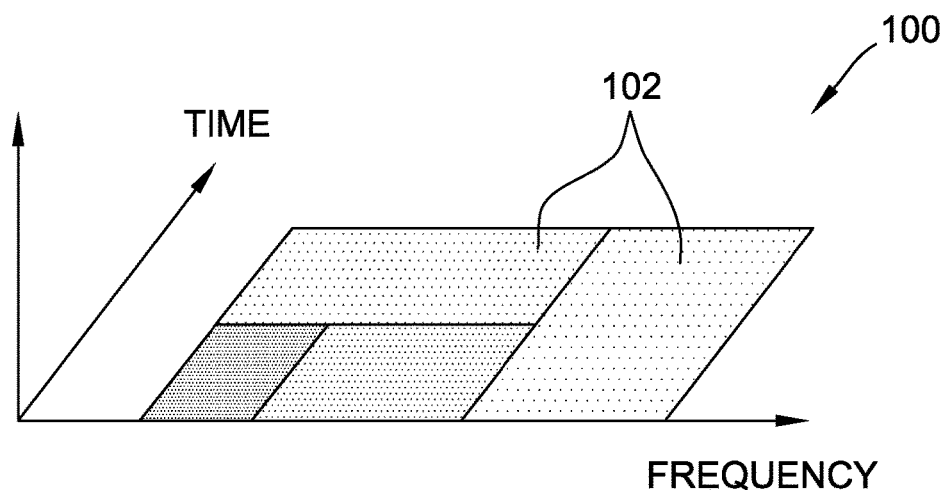
FIG. 1 is a graphical illustration depicting a conventional orthogonal multiple access two-dimensional frequency-time-power distribution of users.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The present embodiments advantageously improve over the conventional OMA techniques, described above, by implementing non-orthogonal multiple access (NOMA) to expand the channel resource space into a third dimension, namely, that of the power domain (i.e., PD-NOMA) and/or the code domain (i.e., CD-NOMA). The present systems and methods are therefore able to take the channel difference between different users and different frequencies into consideration, and then optimize the resource allocation of the network (e.g., an HFC network) in a more equitable manner. According to the techniques described herein, both the spectral efficiency and the throughput of the network are significantly increased, while also advantageously generating more use cases, and including more classes of users, than may be realized according to the conventional techniques.

Figure 2:
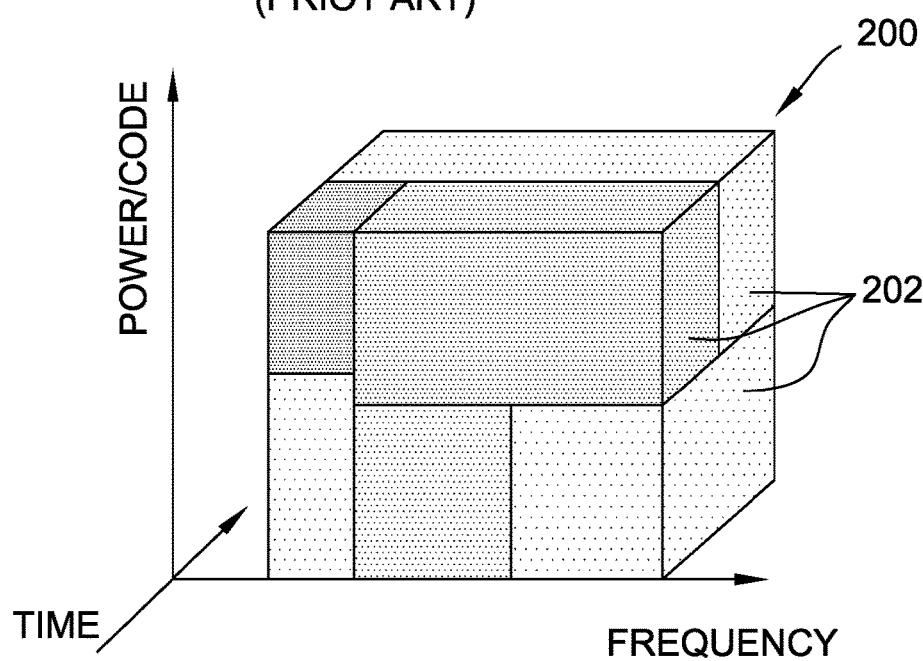
FIG. 2 is a graphical illustration depicting a non-orthogonal multiple access three-dimensional distribution of users, in accordance with an embodiment.

FIG. 2 is a graphical illustration depicting a non-orthogonal multiple access (NOMA) three-dimensional distribution 200 of resource blocks 202 for individual users. Distribution 200 represents an exemplary three-dimensional space of the resources allocated to various users that may occupy the same frequency-time slot in two dimensions, but which may overlap in a third dimension of power (e.g., PD-NOMA) and/or code (e.g., CD-NOMA). In this example, each resource block 202 indicates a three-dimensional representation of resources allocated to a particular user. In some cases, multiple different resource blocks 202 may be allocated to the same user. Techniques for allocating resources to users, and to groups of users, may be performed as described below, for various purposes and according to particular constraints, in order to maximize overall capacity, while also ensuring throughput to individual users and user groups. The following examples are described with respect to an HFC network communication system for ease of explanation, but not in a limiting sense. The person of ordinary skill in the art will understand how the principles of the present embodiments are applicable to other types of communication networks and protocols.

Figure 3:
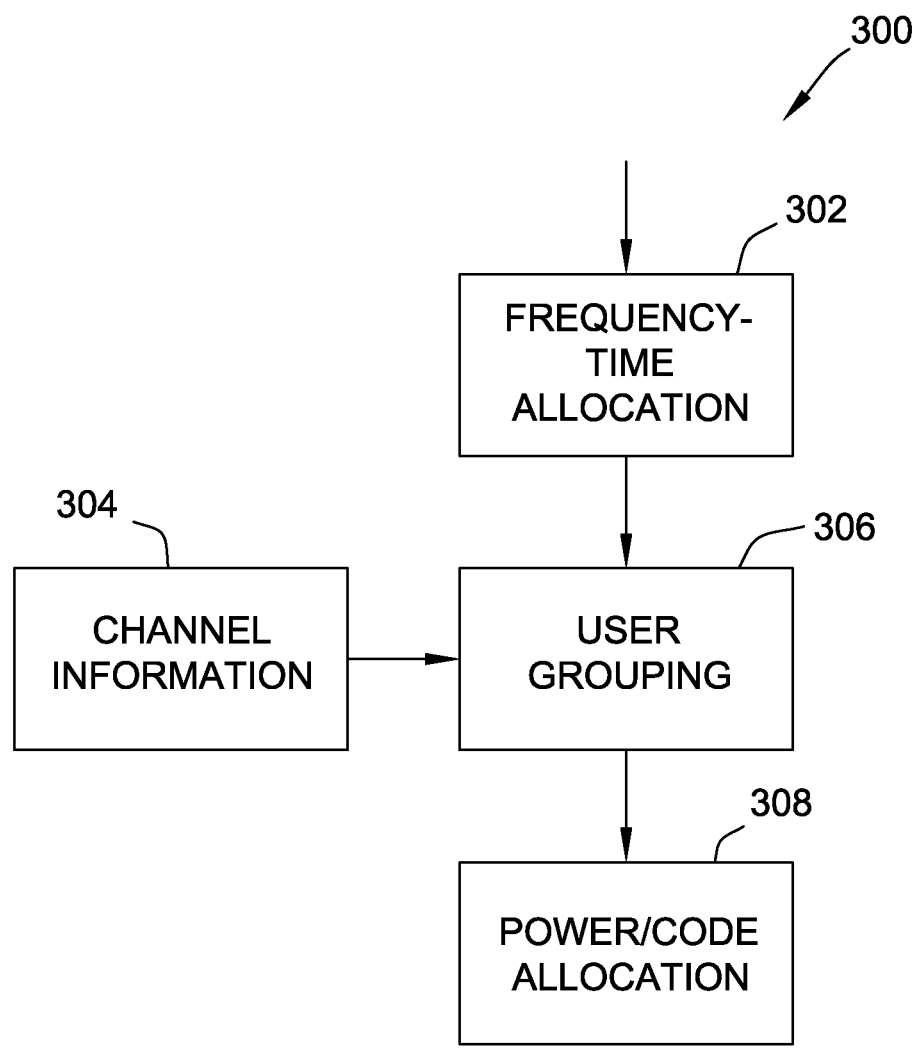
FIG. 3 is a flow diagram for an exemplary resource allocation process for the non-orthogonal multiple access distribution depicted in FIG. 2.

FIG. 3 is a flow diagram for an exemplary resource allocation process 300 for NOMA distribution 200, FIG. 2. In the exemplary embodiment, process 300 may allocate channel resources with respect to an HFC system implementing NOMA. Process 300 is described herein with reference to an exemplary communication system 400 illustrated in FIG. 4, below. Except where described to the contrary, the particular order of steps in process 300 are provided for purposes of illustration, and not in a limiting sense.

Figure 4:
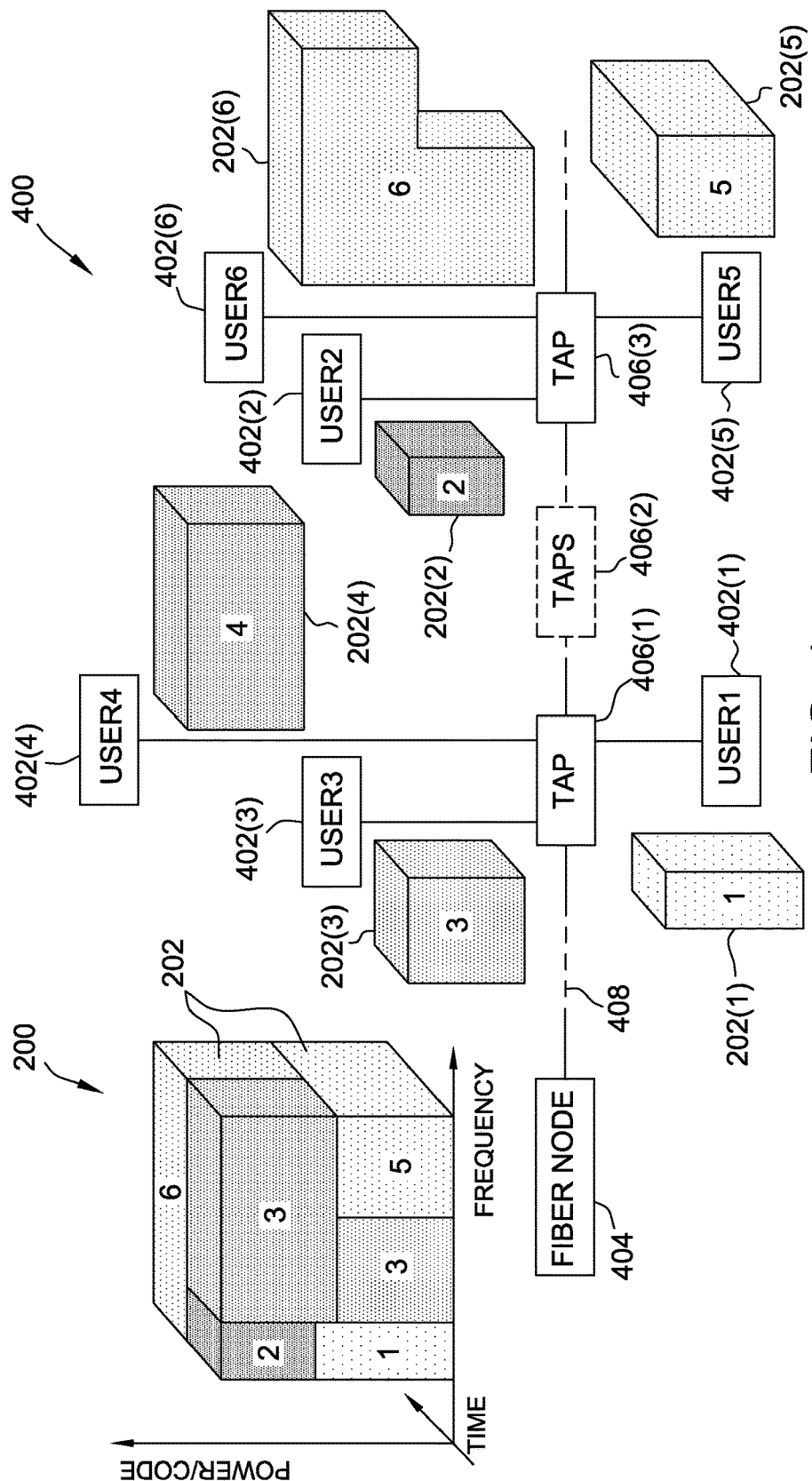
FIG. 4 is a partial schematic illustration of a communication system configured to implement the allocation process depicted in FIG. 3.

In exemplary operation, process 300 begins at step 302, in which a frequency-time resource is allocated to a set of users 402 (FIG. 4, below). In an exemplary embodiment of step 302, the two-dimensional frequency-time portion (i.e., the rectangular area on the frequency-time plane) of each three-dimensional resource block is assigned to users 402 (six, in this example) that are communicatively connected to a same HFC plant (e.g., transport medium 408, FIG. 4, below) belonging to the same service group. In step 304, process 300 obtains channel information regarding the particular channel of communication system 400 for which resources are allocated. In an exemplary embodiment of step 304, the channel information includes the frequency response and signal-to-noise-ratio (SNR)/noise level at each user 402.

In step 306, based on the channel information, the set of users 402 are divided into groups. In an exemplary embodiment of step 306, each user group is formed of users that occupy the same two-dimensional frequency-time resource, but at a different power/code domain level. Accordingly, in some embodiments, each user 402 may belong to multiple groups at the same time (e.g., users 402(4), 402(5), 402(6)). In this case, different users 402 are capable of occupying different amounts of frequency-time resources, that is, different users may have different sizes and shapes of resource blocks 202. In an embodiment, user grouping may be performed according to criteria such as maximized capacity, system requirements satisfaction, service level agreement fulfillment, and present or dynamic traffic demands. In step 308, within each group, process 300 calculates the optimal power/code allocation among users 402.

FIG. 4 is a partial schematic illustration of a communication system 400 configured to implement allocation process 300, FIG. 3. In the exemplary embodiment, communication system 400 is an HFC system implementing the present NOMA techniques for users 402, and includes a node 404 (e.g., a fiber node), and a plurality of taps 406 for connecting respective users 402 to a signal transport medium 408 (e.g., a fiber strand, coaxial cable, etc.). In exemplary operation of system 400, first user 402(1) and second user 402(2) are depicted to occupy the same two-dimensional frequency-time slot, and thus may belong to the same group (e.g., step 306, FIG. 3). When seen three-dimensionally though, first user 402(1) and second user 402(2) are separated in the power/code domain according to the power/code allocation determined by the system (e.g., step 308, FIG. 3). In an exemplary embodiment, system 400 is configured to perform the power/code allocation according to, criteria including, without limitation, maximized capacity, system requirements satisfaction, service level agreement fulfillment, and present or dynamic traffic demands, as described above.

Figure 5:
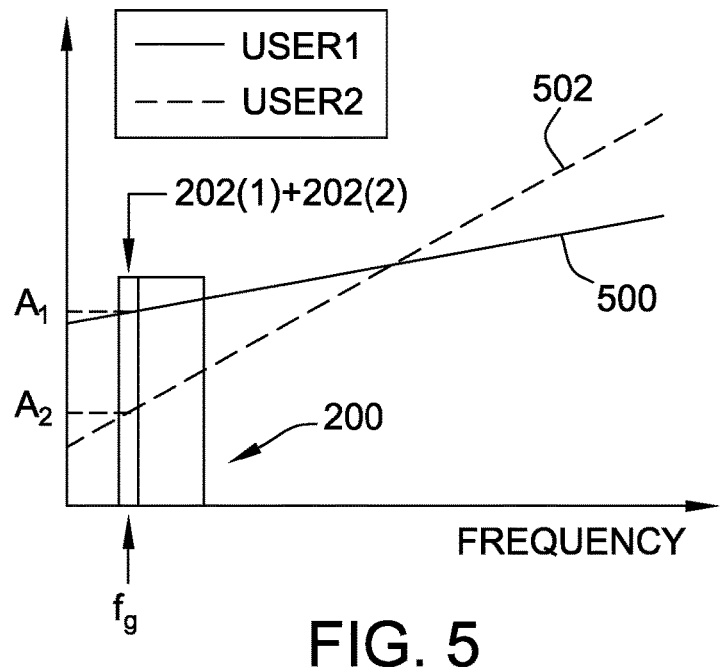
FIG. 5 is a graphical illustration depicting respective attenuation versus frequency plots for the first and second users depicted in FIG. 4.

FIG. 5 is a graphical illustration depicting respective attenuation versus frequency plots 500, 502 for first and second users 402(1), 402(2), FIG. 4. For ease of explanation, an exemplary description of gain and signaling effects in FIG. 5 are limited to only two users 402 (i.e., plots 500, 502), but the person of ordinary skill in the art will understand how these principles apply with respect to more than two users on a cable plant. In an exemplary embodiment depicted in FIG. 5, first and second users 402(1), 402(2) occupy the same frequency-time slot, but are separated in the power domain.

For further ease of explanation, in this example, it is assumed that (1) capacity is the exemplary criterion used to determine the resource allocation in the power domain over a frequency-time slot, (2) the frequency-time slot is fixed by other preconditions or constraints of the overall allocation, (3) the frequency range of the given frequency-time slot is relatively small, (4) the total power for 402(1), 402(2) over the given frequency-time slot is fixed by other preconditions or constraints of the overall allocation (and is denoted as P), and (5) the channel is time-invariant. The person of ordinary skill in the art though, will understand that these assumptions are provided by way of example, and not in a limiting sense.

In the exemplary embodiment depicted in FIG. 5, first user 402(1) and second user 402(2) are located at different physical locations within the HFC network of communication system 400. In this example, first user 402(1) is located nearer in proximity to node 404 with respect to second user 402(2), which is located farther away from node 404. Therefore, irrespective of any pre-emphasis, second user 402(2) will experience significantly more power variation, that is, attenuation, over a frequency range, as illustrated by the greater slope to plot 502 (user2) in comparison with the more linear, horizontal slope of plot 500 (user1). This variation difference results in the difference of attenuation (e.g., $A_1$ versus $A_2$) exhibited by first user 402(1) and second user 402(2), respectively, at a given frequency $f_g$.

In the example illustrated in FIG. 5, a two-dimensional cross-section of the resource blocks 202(1), 202(2) are depicted with respect to a two-dimensional cross-section of the entire distribution 200. As may be seen from this exemplary illustration, second user 402(2) has a lower attenuation value $A_2$ at frequency $f_g$, and the average attenuation values within the frequency slot that includes frequency $f_g$ may be approximated to $A_1$ and $A_2$ (in dB) for first user 402(1) and second user 402(2), respectively.

Assuming, for purposes of this description, that the additive white Gaussian noise (AWGN) channels and Gaussian noise have a power of N within the frequency slot $f_g$ at a receiver side of system 400, the spectral efficiency $\eta$ of first user 402(1) and second user 402(2) within the frequency slot $f_g$ may be respectively represented by:

$$\eta_1 \leq \log_2\left(1 + \frac{a_1 Px}{N + a_1(1-x)P}\right) \quad \text{(Eq. 1)}$$

for first user 402(1)/user1, and by:

$$\eta_2 \leq \log_2\left(1 + \frac{a_2(1-x)P}{N}\right) \quad \text{(Eq. 2)}$$

for second user 402(2)/user2, where $a_1 = 10^{\wedge}(-A_1/10)$, $a_2 = 10^{\wedge}(-A_2/10)$, P is the total power budget for both users at the transmitter side, and $0 \leq x \leq 1$ is the proportion of power for first user 402(1). The total spectral efficiency $\eta_{total}$ may then be represented as:

$$\eta_{total} = \eta_1 + \eta_2 \leq \log_2\left(\frac{N^2 + (a_1 + a_2)PN + a_1 a_2 P^2 - a_2 P(N + a_1 P)x}{N^2 + a_1 PN - a_1 PNx}\right) \quad \text{(Eq. 3)}$$

Accordingly, in the embodiments described above, including allocation process 300, system 400 is advantageously configured to enable maximization of $\eta_1$, $\eta_2$, and/or $\eta_{total}$ according to a desired purpose of the system operator, and/or preconditions or constraints that may be placed on the system and its operation. In some embodiments, resource allocation may be further realized by adjusting value of x.

Figure 6:
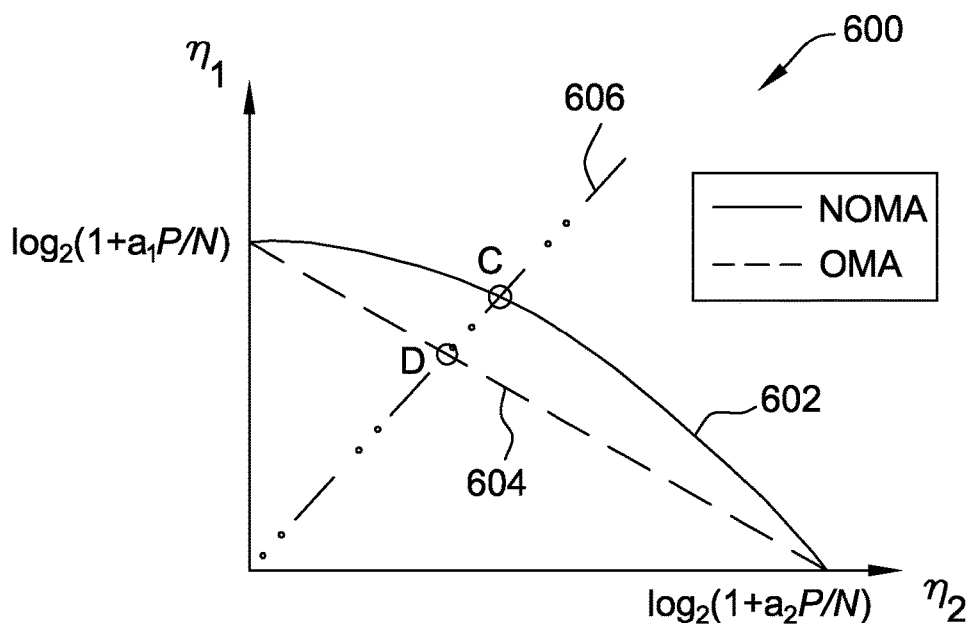
FIG. 6 is a graphical illustration depicting an exemplary derivation technique for maximizing spectral efficiency of the first and second users depicted in FIG. 4.

FIG. 6 is a graphical illustration depicting an exemplary derivation technique 600 for maximizing spectral efficiency of first and second users 402(1), 402(2), FIG. 4. The exemplary embodiment illustrated in FIG. 6 is depicted with respect to a derivation of maximum $\eta_1$ and $\eta_2$ implementing PD-NOMA. The person of ordinary skill in the art though, will appreciate that the principles described herein are applicable to other NOMA techniques, such as CD-NOMA, etc.

In an exemplary embodiment, the spectral efficiencies $\eta_1$ and $\eta_2$ are maximized for first user 402(1) and second user 402(2), respectively. Thus, by traversing the value x over [0, 1], an upper boundary curve 602 of ($\eta_1$, $\eta_2$) may be derived for the PD-NOMA implementation. With respect to the exemplary embodiment depicted in FIG. 6, the area under upper boundary curve 602 is considered to be achievable. FIG. 6 further illustrates, for comparison, a counterpart curve 604 representing an upper limit achievable through the conventional OMA technique. As can be seen from the comparison, the greater boundary is achievable implementing the present NOMA techniques.

In an exemplary embodiment of technique 600, a constraint 606 of $\eta_1=\eta_2$ is applied, which intersects both curves 602, 604 at points C and D, respectively. Thus, when compared with OMA value (i.e., point D) of counterpart curve 604, the spectral efficiency of both $\eta_1$ and $\eta_2$ are improved for the PD-NOMA implementation (i.e., point C).

Figure 7:
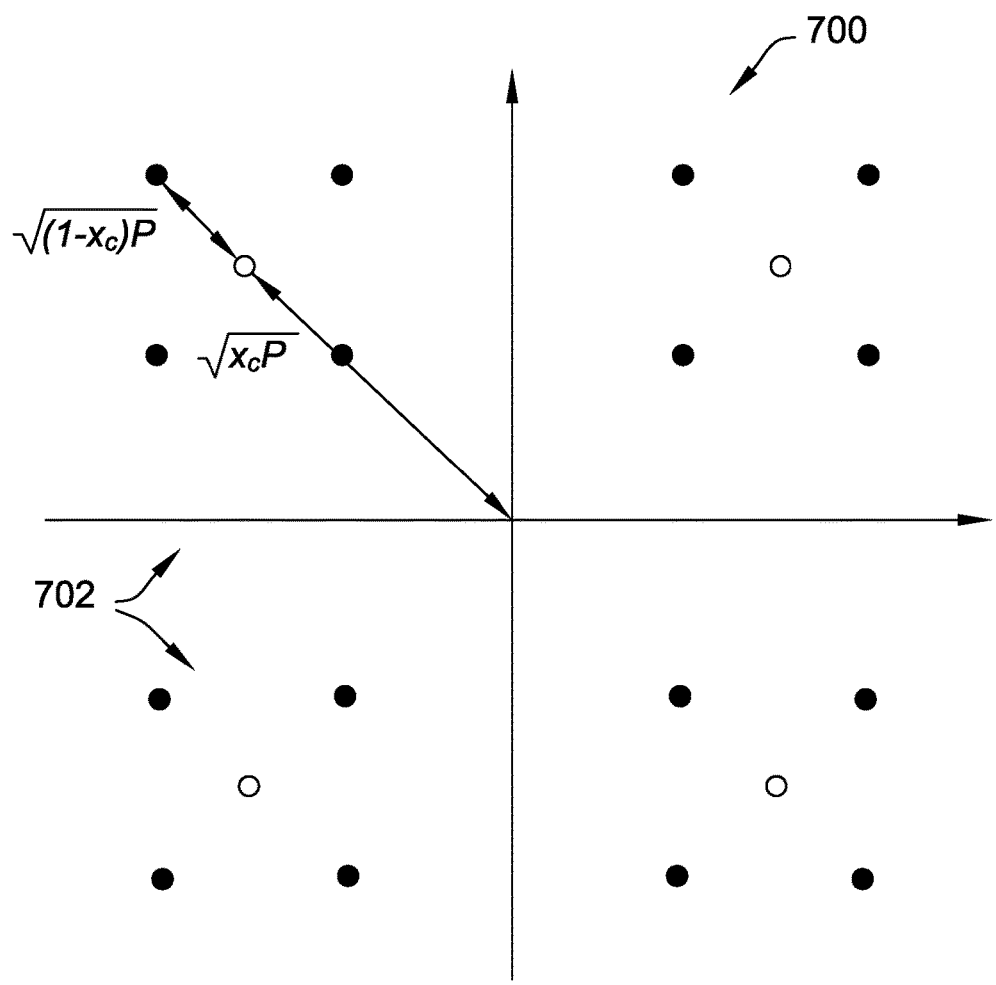
FIG. 7 is a graphical illustration depicting a constellation plot of superimposed signals corresponding to the first and second users depicted in FIG. 4.

FIG. 7 is a graphical illustration depicting a constellation plot 700 of superimposed signals 702 corresponding to first and second users 402(1), 402(2), FIG. 4. In the exemplary embodiment illustrated in FIG. 7, constellation plot 700 is depicted with respect to two superimposed QPSK signals implementing PD-NOMA, and using derivation technique 600. In this example, the modulation format is designated to approach the maximum spectral efficiency η at point C on upper boundary curve 602. Using the respective amplitudes of constellation 700, the value for x at point C may be derived.

Figure 8:
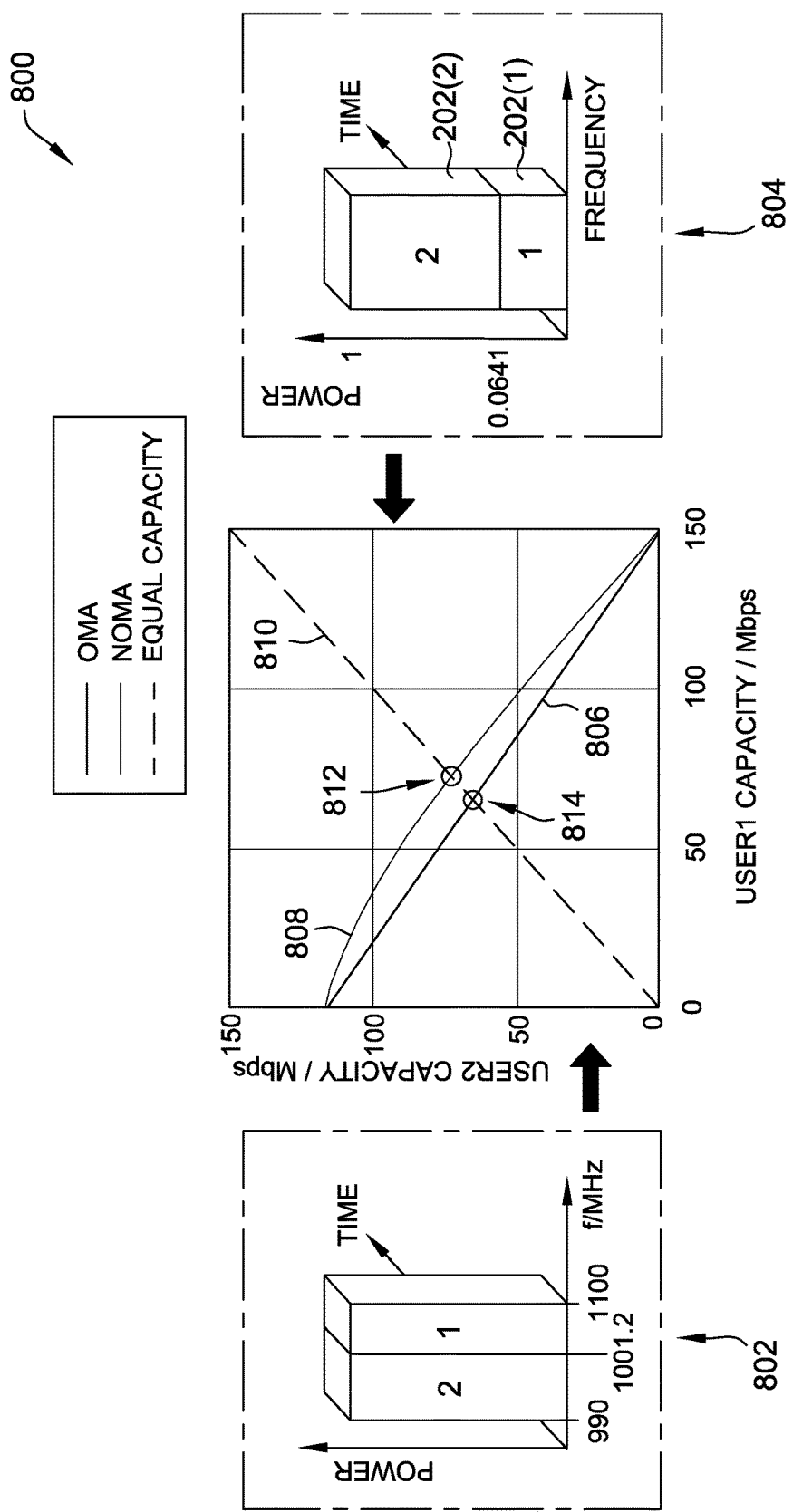
FIG. 8 is a graphical illustration demonstrating a capacity tradeoff effect between the first and second users depicted in FIG. 4 according to the conventional orthogonal multiple access technique compared with the present non-orthogonal multiple access techniques.

FIG. 8 is a graphical illustration demonstrating a capacity tradeoff effect 800 between first and second users 402(1), 402(2), FIG. 4, according to the conventional OMA technique compared with the present NOMA techniques. In the exemplary embodiment illustrated in FIG. 8, trade-off effect 800 demonstrates the simulation results of a capacity tradeoff between user1 and user2 at a distance of 300 ft from the node (e.g., node 404, FIG. 4), for an OMA case 802 and a NOMA case 804.

In this example, the respective resource blocks 202 of first and second users 402(1), 402(2) (i.e., user1 and user2) are assumed to occupy a total bandwidth of 20 MHz, and at a central frequency of 1 GHz after frequency-time allocation and user grouping. Referring back to FIG. 4, the tap to which user1 connects (e.g., tap 406(1)) is, in this example, 100 ft away from fiber node 404, while the tap to which user2 connects (e.g., tap 406(2)) is 300 ft away from node 404. In this simulation, taps 406 were communicatively connected to node 404 by 75-Ohm 0.5-inch hardline cables, and the noise density at the receiver end of simulated system 400 was 25-dB lower than the transmitted signal power density.

Accordingly, when compared with first user 402(2), second user 402(2) experiences higher attenuation at 1 GHz due to the fact that second user 402(1) is farther away from node 404. Thus, because first and second users 402(1), 402(2) share the same frequency resource (20 MHz, in this example), the relative capacity both users has a tradeoff relationship. As can be seen from the exemplary effect 800 depicted in FIG. 8, the tradeoff for both of first and second users 402(1), 402(2) is demonstrated along both an OMA curve 806 and a PD-NOMA curve 808. Additionally, when and equal capacity constraint 810 is applied as a criterion for effect 800, it can be seen that, at point 812 on NOMA curve 808, 7 Mbps (i.e. 10.6%) of higher capacity is realized in comparison with a corresponding equal-capacity point 814 on OMA curve 806.

Accordingly, implementing OMA techniques, trade-off effect 800 demonstrates, in this simulation example, that 1001.2-1010 MHz is allocated to first user 402(1) and 990-1001.2 MHz is allocated to second user 402(2). However, in contrast, the implementation of PD-NOMA enables 6.41% of the total transmitted power to be allocated to first user 402(1) and 93.59% of the transmitted power to be allocated to second user 402(2).

Figure 9:
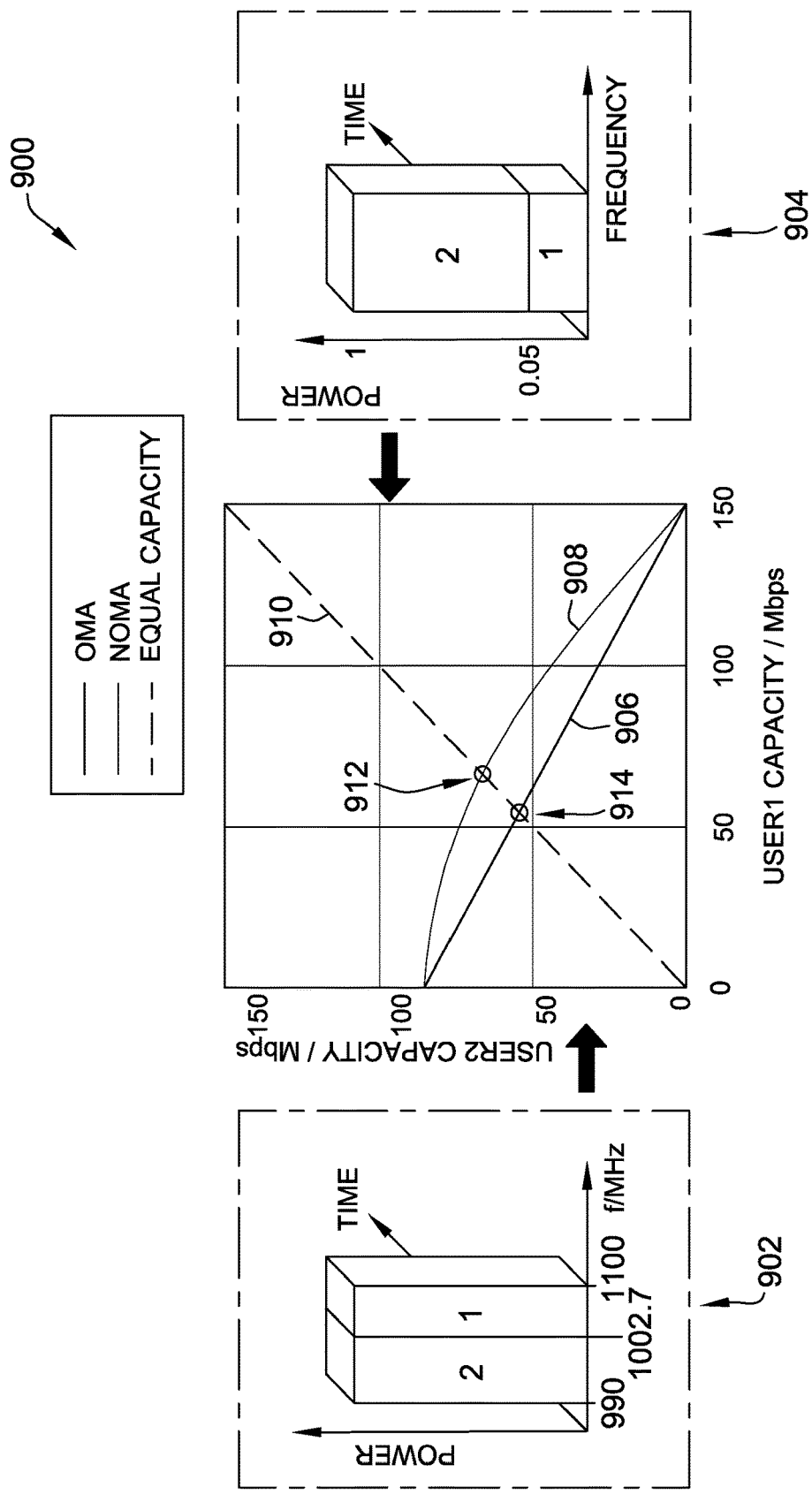
FIG. 9 is a graphical illustration demonstrating a capacity tradeoff effect between the first and second users depicted in FIG. 4 according to the conventional orthogonal multiple access technique compared with the present non-orthogonal multiple access techniques.

FIG. 9 is a graphical illustration demonstrating a capacity tradeoff effect 900 between first and second users 402(1), 402(2), FIG. 4, according to the conventional OMA technique compared with the present NOMA techniques. Tradeoff effect 900 is similar to tradeoff effect 800, FIG. 8, except that tradeoff effect 900 demonstrates simulation results for second user 402(2) located 500 ft from node 404, for an OMA case 902 and a NOMA case 904, as opposed to the 300 ft distance described above with respect to FIG. 8. Accordingly, a higher improvement may be observed from the implementation of the present NOMA techniques for users 402 located at even greater distances from node 404.

Also similar to effect 800, effect 900 depicts an OMA curve 906 and a NOMA curve 908, and applies an equal capacity constraint 910 as a criterion. In this example, it may be seen that, at point 912 on NOMA curve 908, 11.9 Mbps (i.e. 21.8%) of higher capacity is realized in comparison with a corresponding equal-capacity point 914 on OMA curve 906. Additionally, implementing OMA techniques, 1001.2-1010 MHz is again allocated to first user 402(1) and 990-1001.2 MHz is again allocated to second user 402(2). However, in this example, the implementation of PD-NOMA enables 5% of the total transmitted power to be allocated to first user 402(1) and 95% of the transmitted power to be allocated to second user 402(2).

Figure 10:
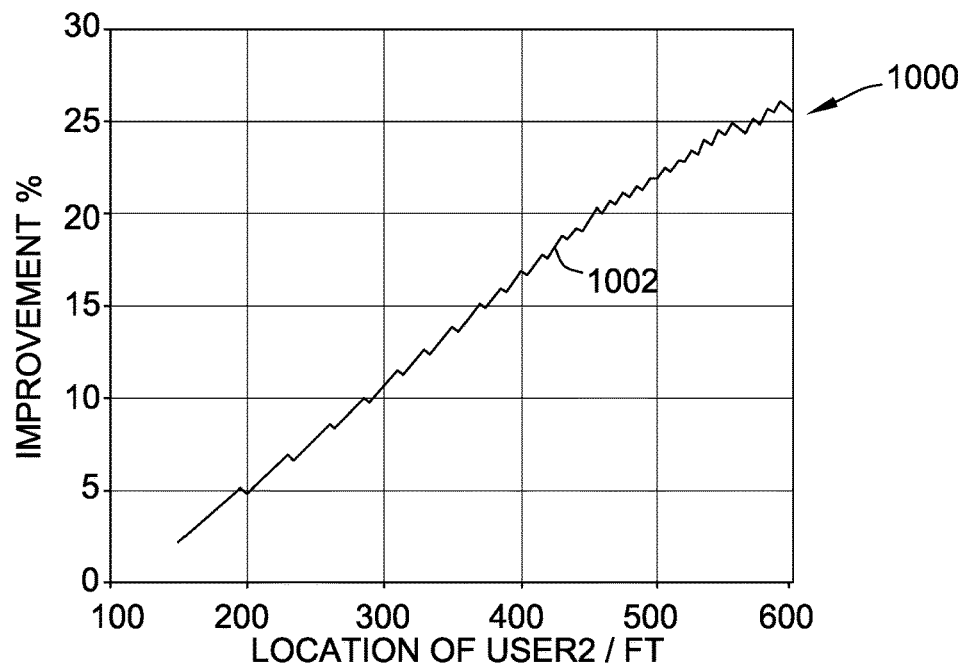
FIG. 10 is a graphical illustration depicting a distance versus capacity improvement effect for the second user depicted in FIG. 4.

FIG. 10 is a graphical illustration depicting a distance versus capacity improvement effect 1000 for second user 402(2), FIG. 4. In the exemplary embodiment, improvement effect 1000 demonstrates, through simulation, the results achieved by implementation of the present NOMA techniques (e.g., in comparison with conventional OMA techniques). More particularly, improvement effect 1000 depicts a relationship curve 1002 between the location of second user 402(2) and the capacity improvement using NOMA, when first user 402(1) is fixed at a location 100 ft away from the node 404 in these simulations. Relationship curve 1002 therefore becomes a valuable tool for grouping users (e.g., step 306 of process 300, FIG. 3), based on the respective locations of various users, as well as other chosen criteria of the system.

Figure 11:
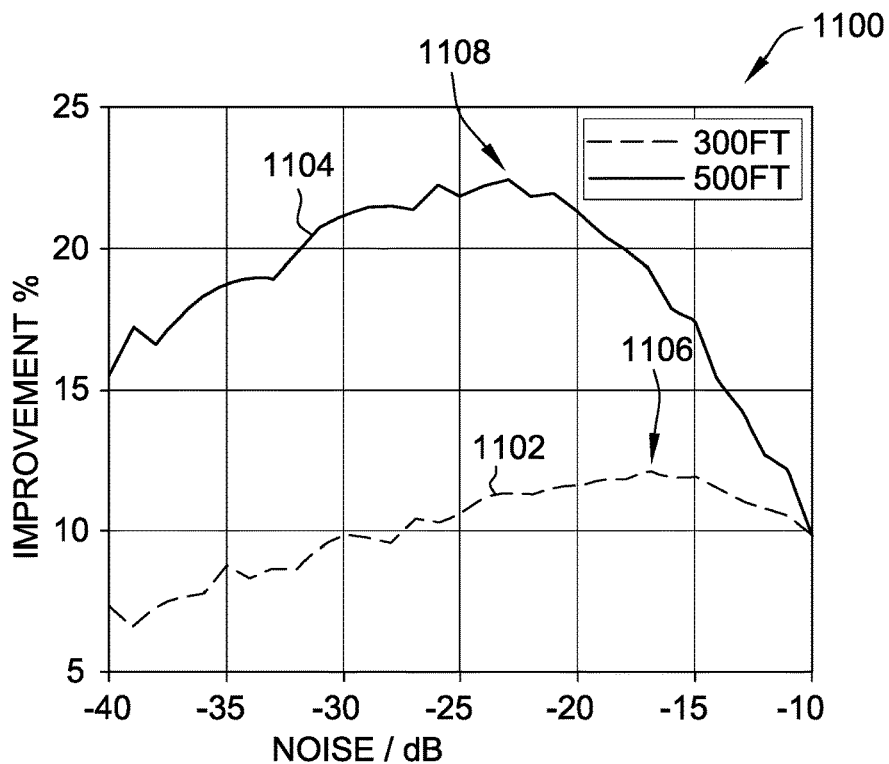
FIG. 11 is a graphical illustration depicting a noise level versus capacity improvement effect for the second user depicted in FIG. 4 according to the conventional orthogonal multiple access technique compared with the present non-orthogonal multiple access techniques.

FIG. 11 is a graphical illustration depicting a noise level versus capacity improvement effect 1100 for second user 402(2), FIG. 4, according to the present NOMA techniques compared with the conventional OMA technique. In an exemplary embodiment, the capacity improvement may also be determined based on respective noise level experienced by a particular user at various distances from the node. Improvement effect 1100 depicts the capacity improvement (i.e., the vertical axis, in %) under different noise levels (i.e., the horizontal axis, in dB) for a first condition 1102 when second user 402(2) is located 300 ft from node 404, and for a second condition 1104 when second user 402(2) is located 500 ft away from node 404. Under first condition 1102 (i.e., 300 ft) a first maximal point 1106 is found when the noise level is approximately −17 dB, while under second condition 1104 (i.e., 500 ft), a second maximal point 1108 is found when the noise level is approximately −23 dB. The respective curves of first and second conditions 1102, 1104 therefore also provide valuable tool for grouping users (e.g., step 306 of process 300, FIG. 3), based on the respective noise levels and locations of various users, as well as other chosen criteria of the system.

The present embodiments are described above with respect to HFC networks by way of example, and not in a limiting sense. The person of ordinary skill in the art will appreciate how the systems and methods described herein are also applicable to the optical fiber segments in the HFC network, as well as a passive optical network (PON) architecture that utilizes optical fiber segments in multiple fiber nodes at endpoints, which may be analogous to the various users described with respect to the present embodiments. The NOMA techniques described herein are also provided for illustrative purposes, but are not intended to be limiting. Other NOMA techniques, for example, may also be implemented within the scope of the present embodiments, including without limitation Multi-User Superposition Transmission (MUST), Sparse Code Multiple Access (SCMA), Pattern Division Multiple Access (PDMA), Lattice Partition Multiple Access (LPMA), and/or Multi-User Shared Access (MUSA).

The person of ordinary skill will further appreciate that the present techniques are generally applicable to access systems having a power domain and/or a code domain, and which adopt non-orthogonal signal space in an HFC network. As featured above, the principles of the present systems and methods are described with respect to two users separated in the power/code domain. Nevertheless, the person of ordinary skill in the art will appreciate that these principles apply in the case of more than two users separated in the power/code domains. It will further be appreciated, from the description herein and the accompanying drawings, that the present techniques for optimizing the power/code domains are not exclusive of optimization techniques for the frequency and time domains. That is, the present embodiments may be employed as joint allocation and/or joint optimization techniques for the power/code domain in a complementary and/or simultaneous fashion with allocation/optimization techniques of the frequency and time domains.

Exemplary embodiments of systems and methods for optimizing non-orthogonal multiple access are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this is for convenience only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a DSP device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A resource allocation method for a non-orthogonal multiple access (NOMA) distribution of access network users communicatively coupled to a single transport medium, the method comprising the steps of:
   allocating a first frequency and time domain resource to a first user and a second frequency and time domain resource to a second user of the access network users;
   obtaining channel information regarding a particular communication channel of the access network for which resources are allocated;
   grouping the first user with the second user based on an overlap of the first frequency and time domain resource with the second frequency and time domain resource; and
   assigning the first user to a different power allocation resource than the second user within the frequency and time domain overlap.

2. The method of claim 1, wherein the access network comprises a hybrid fiber coaxial network.

3. The method of claim 1, wherein the channel information includes a frequency response and a signal-to-noise-ratio (SNR) of the first user and the second user.

4. The method of claim 3, wherein the step of grouping is further based on a respective difference in noise level between the first user and the second user.

5. The method of claim 1, wherein the step of grouping is further based on a distance of the first user from a node of the access network relative to a distance of the second user from the node.

6. The method of claim 1, wherein the first user is allocated a first resource block and the second user is allocated a second resource block, and wherein the first and second resource blocks are defined by a virtual three-dimensional coordinate system consisting of a frequency dimension, a time dimension, and a power dimension.

7. The method of claim 6, wherein the first and second resource blocks do not occupy the same space within the virtual three-dimensional coordinate system.

8. The method of claim 7, wherein the first and second resource blocks are allocated to optimize capacity of the first user and the second user in the virtual frequency-time-power coordinate domain.

9. The method of claim 8, further comprising a step of composing a constellation based on the optimized capacity of the frequency-time-power allocation.

10. The method of claim 1, wherein the step of grouping is further based on one or more of maximum capacity of the first user and the second user, system requirements of the access network, service level agreement fulfillment terms, and network traffic demand.

11. A resource allocation method for a non-orthogonal multiple access (NOMA) distribution of access network users communicatively coupled to a single transport medium, the method comprising the steps of:
   allocating a first frequency and time domain resource to a first user and a second frequency and time domain resource to a second user of the access network users;

obtaining channel information regarding a particular communication channel of the access network for which resources are allocated;

grouping the first user with the second user based on an overlap of the first frequency and time domain resource with the second frequency and time domain resource; and assigning the first user to a different code allocation resource than the second user within the frequency and time domain overlap.

* * * * *